(12) United States Patent
McMullan

(10) Patent No.: US 11,353,001 B1
(45) Date of Patent: Jun. 7, 2022

(54) HYDROKINETIC GENERATOR

(71) Applicant: Sitkana Inc., Seattle, WA (US)

(72) Inventor: Lance Davis McMullan, Seattle, WA (US)

(73) Assignee: Sitkana Inc., Seattle, WA (US)

( * ) Notice: Subject to any disclaimer, the term of this patent is extended or adjusted under 35 U.S.C. 154(b) by 0 days.

(21) Appl. No.: 17/505,987

(22) Filed: Oct. 20, 2021

Related U.S. Application Data

(60) Provisional application No. 63/182,284, filed on Apr. 30, 2021.

(51) Int. Cl.
*F03B 17/06* (2006.01)
*F03B 13/10* (2006.01)

(52) U.S. Cl.
CPC ............ *F03B 17/061* (2013.01); *F03B 13/10* (2013.01); *F05B 2240/30* (2013.01); *F05B 2240/917* (2013.01); *F05B 2240/97* (2013.01)

(58) Field of Classification Search
CPC .................. F03B 13/10; F05B 2240/30; F05B 2240/917; F05B 2240/97
USPC ...................................... 290/43, 54
See application file for complete search history.

(56) References Cited

U.S. PATENT DOCUMENTS

| | | |
|---|---|---|
| 4,335,319 A | 6/1982 | Mettersheimer, Jr. |
| 4,820,217 A | 4/1989 | Joubert et al. |
| 6,734,576 B2 * | 5/2004 | Pacheco ................ F03B 17/065 290/55 |
| 6,756,695 B2 | 6/2004 | Hibbs et al. |
| 7,291,936 B1 | 11/2007 | Robson |
| 7,470,086 B2 | 12/2008 | Jennings et al. |
| 7,696,633 B2 | 4/2010 | Zajchowski et al. |
| 7,791,214 B2 | 11/2010 | Hill |
| 8,022,567 B2 | 9/2011 | Davis et al. |
| 8,102,071 B2 | 1/2012 | Catlin |

(Continued)

FOREIGN PATENT DOCUMENTS

| | | | |
|---|---|---|---|
| CN | 101970854 B | * 11/2014 | ............... F03B 13/10 |
| CN | 109278967 A | 1/2019 | |

(Continued)

OTHER PUBLICATIONS

Hydrokinetic Energy, URL= https://www.fws.gov/ecological-services/energy-development/hydrokinetic.html, May 2, 2018, download date Oct. 19, 2021.

*Primary Examiner* — Charles Reid, Jr.
(74) *Attorney, Agent, or Firm* — Seed Intellectual Property Law Group LLP

(57) ABSTRACT

A hydrokinetic electric generator system for use in water that includes a first generator located inside a submersible first housing with fore and aft sections with respective fore and aft attachment points, a center of mass of the first generator located between the fore and aft attachment points, the first generator having a shaft extending out the aft section of the first housing with a turbine attached to the shaft, a flotation support structured to float on the water, and a first cable having a first end attached to the flotation support and a second end attached to the first attachment point on the fore section, and a second cable having a first end attached to the flotation support and a second end attached to the second attachment point in a manner to permit the system to change position in response to changes in direction of water current.

25 Claims, 14 Drawing Sheets

(56) References Cited

U.S. PATENT DOCUMENTS

| | | | |
|---|---|---|---|
| 8,115,329 B2 | 2/2012 | Thompson | |
| 8,614,523 B2 * | 12/2013 | Reynolds | F03B 13/10 290/55 |
| 8,616,829 B2 * | 12/2013 | Becker | F03B 3/04 416/243 |
| 8,710,688 B2 * | 4/2014 | Pitre | F03D 9/255 290/43 |
| 9,352,805 B2 | 5/2016 | Kawabe et al. | |
| 9,506,451 B2 | 11/2016 | Dehlsen | |
| 9,745,951 B1 | 8/2017 | Doyle | |
| 10,040,528 B2 | 8/2018 | Song et al. | |
| 10,207,773 B2 | 2/2019 | Betcher | |
| 10,415,535 B2 | 9/2019 | Manshanden | |
| 2009/0022597 A1 * | 1/2009 | Bowie | F03B 17/061 416/223 R |
| 2009/0058090 A1 | 3/2009 | Henriksen | |
| 2009/0140524 A1 | 6/2009 | Kejha | |
| 2009/0311102 A1 | 12/2009 | Poll | |
| 2017/0184069 A1 | 6/2017 | Roberts | |
| 2017/0201157 A1 | 7/2017 | Kiezebrink | |
| 2019/0010915 A1 | 1/2019 | MacDonald | |

FOREIGN PATENT DOCUMENTS

| | | | |
|---|---|---|---|
| GB | 2434410 A | 7/2007 | |
| GB | 2459843 A * | 11/2009 | F03B 13/264 |
| WO | 2004/002817 | 1/2004 | |
| WO | 2010/011370 | 1/2010 | |

* cited by examiner

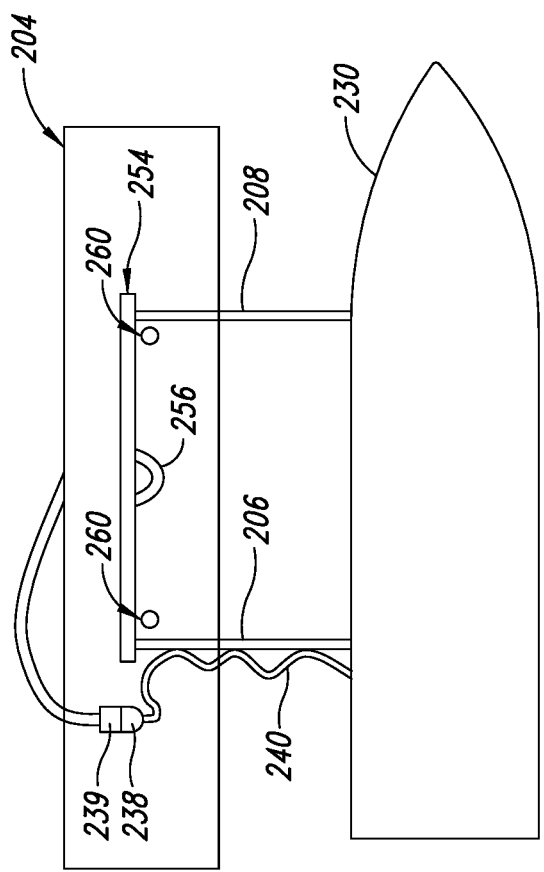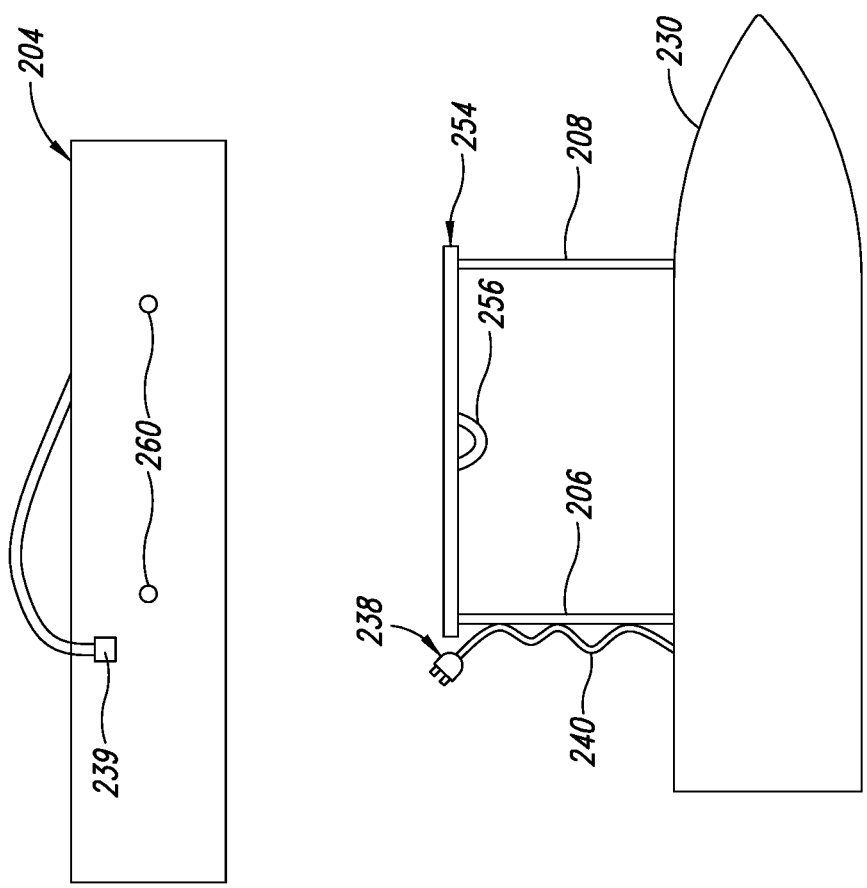
FIG. 13B
FIG. 13A

HYDROKINETIC GENERATOR

BACKGROUND

Technical Field

The present disclosure is directed to the generation of electricity and, more particularly, to a submerged generator system for use in a stream of water that maintains directional stability and directs water through a high efficiency impeller or turbine.

Description of the Related Art

With the world's growing population, there is a constant need to provide more electrical energy. According to the U.S. Energy Information Administration (EIA), as of February 2021, fossil fuels account for 60.3% of electrical energy generation in the United States while renewable sources account for 19.8%. Most scientists agree that the burning of fossil fuels for energy production is detrimental to the environment and that it would be beneficial to transition toward renewable energy sources. Renewable energy sources, such as solar and wind energy, are found naturally due to geologic attributes and are not depleted when they are used.

Often, these are found abundantly in some areas while they are scarce in others. For example, there is an area near Palm Springs, Calif., where there are strong prevailing wind currents. This is due to the relationship between the cool air above the nearby Pacific Ocean and the hot air above the Mojave Desert, connected by narrow valleys. The air temperature differences drive convection currents, generating fluid movement that creates available wind energy. As a result, this area has rapidly developed into one of the best locations in the United States for wind energy generation. This area near the Mojave Desert also receives very little rainfall and has generally clear skies, making it a great location for solar energy as well. The wind and solar resources from this region provide support for the nearby metropolitan areas such as Los Angeles and San Diego.

It would be ideal if consistent renewable energy resources were near every metropolitan area, but this is not reality. Washington's coast is classified as a rainforest due to the rainfall per year, and it is often cloudy. Solar energy would not produce reliable power in this location. Electricity is costly to store and transmit, so it is not feasible to collect solar power elsewhere and send it to Washington. According to Environment America, six U.S. states have a goal of 100% renewable energy by 2050 (Maine, New York, Hawaii, California, New Mexico, and Washington), with more likely to join this target. Each state will have to adapt to their own geological conditions and use naturally available energy sources.

The high economic cost of infrastructure needed for energy transmission is prohibitive and outweighs the environmental benefits in most circumstances. For this reason, electricity is generally produced locally. Because oil is easy to store and transport, the most common solution for energy production is to store oil and burn it in a combustion cycle to spin a local generator, which then produces electricity. In remote areas, disconnected from prevalent winds and unsuitable for solar energy, the burning of fossil fuels is often the only available means of electrical generation. The coastal region of the Pacific Northwest generates electricity this way, especially the remote cities in Southeast Alaska.

One of the largest coastal cities of Southeast Alaska, Sitka (with populations of 9 k) generates 75% of their electrical power from the burning of fossil fuels. According to the Sitka Conservation Society, based on current projections, "Sitka will spend between $1B and $1.5B on oil over the next 20 years." Sitka is located on an island formed between the fjords of the St. Elias Mountains, and can only be accessed by boat or plane. These islands have steep terrain, unsuitable for utility construction. The climate is classified as a rainforest with perpetually cloudy skies. There are no rivers that could be dammed to create a reservoir for traditional hydroelectric power. Baranoff Island, where Sitka is situated, is surrounded by deep wide channels, some a mile wide and over a thousand feet deep, making electric transmission to outside grids impractical. Here there is no realistic path to wind, solar, or hydroelectric power using present technologies.

Sitka is one of nine major cities/towns in Southeast Alaska, which include: Juneau, Sitka, Ketchikan, Petersburg, Wrangell, Haines, Metlakatla, Craig, and Skagway. In total, over sixty thousand people reside in this region. If it is beneficial for the environment to move away from the burning of fossil fuels, then a new solution needs to be developed to bring renewable energy to remote cities such as those of Southeast Alaska.

Available Energy Source

The Earth's tides are created by the moon's gravitational force. As the moon rotates around the planet, its pull is felt by the oceans, which bulge in response to the moon's gravitational pull. This bulge extends in the direction of the moon and also on the opposite side of the Earth and tracks the moon as it rotates. Therefore, as the moon rotates around the Earth once a day, this bulge of ocean water will pass each section of coastline twice—first when the moon is on the same side of the planet, and again when it is on the opposite. This results in two high-tides and two low-tides each day, also known as a semidiurnal tidal cycle.

While the Southeast Alaskan region lacks the ability to develop traditional sources of renewable energy such as wind, solar, and hydroelectric energy from reservoirs, it is surrounded by available kinetic energy resulting from tidal movements. The waterways created by the fjords can be over one hundred miles long, and the entire shoreline experiences these tidal fluctuations. As the water rises fifteen feet in the Pacific Ocean, one hundred miles away, deep in the interior veins of the fjords, the water will also experience this fluctuation. Although the water is rising up and down, at the entrance of these channels water is rushing as the entire water volume (the tide's height times the surface area) must pass through twice a day.

The U.S. Fish and Wildlife Service states on its webpage on Energy Development (www.fws.gov) contains a succinct summary of hydrokinetic energy using tidal currents:

> Tidal energy may be harnessed using offshore underwater devices similar to wind turbines. Submerged rotating devices capture energy through the processes of hydrodynamic lift or drag. These devices consist of rotor blades, a generator for converting the rotational energy into electricity, and a means for transporting the electrical current to the on-shore electrical grid. Submerged turbines can have either a horizontal or vertical axis of rotation. Mechanisms such as posts, cables or anchors are required to keep the turbines stationary relative to the tidal currents. Prototype horizontal axis turbines, similar to wind turbines, have been built and tested. Vertical axis turbine designs have been proposed, with some designs resembling egg beaters.

Turbines may be anchored to the ocean floor in a variety of ways. They may be tethered with cables, using the relatively constant current interacting with the turbine to maintain location and stability. Imagine an underwater kite flying, where the kite is the upright turbine and the kite flyer is the anchor. The system may also include concentrators (or shrouds) around the blades to increase the flow and power output from the turbine. Another proposed design is mooring a barge in the current stream with a large cable loop to which water-filled parachutes are fastened. The parachutes would be pushed by the current and then closed on their way back, forming a loop similar to a large horizontal waterwheel. In large areas with powerful currents, it may be possible to install water turbines in groups or clusters to create a "marine energy facility" (similar in to a wind energy facility). Turbine spacing would be determined based on wake interactions and maintenance needs.

In some areas of the world, tidal basins have been created in which an area is enclosed and connected to ocean through a small gate containing a turbine. As the sea rises and falls, the water rushes into and out of the gate, spinning the turbine as the interior water level adjusts to the shifting exterior sea level. Off the north coast of Scotland, a large turbine array called the MeyGen is installed on the sea floor, powering almost 4,000 homes in 2019 (World Economic Forum). This is one of the most successful applications of tidal energy and very promising for the future of European power. It is essentially made of four three-bladed wind turbines adapted to work underwater, mounted on the seafloor and connected to shore via armored cable for electrical transmission.

Neither of these methods will work in certain locations, such as where the geology of the fjords is unsuitable for ground installation due to steep slopes and extreme depth, particularly in Southeast Alaska where the depth is typically over one thousand feet. The three-bladed design of the turbines from Scotland, mimicking wind turbines, will also not be suitable for the above-described locations, such as Southeast Alaska, where there are orcas, sea otters, seals, sea lions, dolphins, porpoises, and humpback whales. The marine mammals of the Pacific Ocean are well protected, and attempting to introduce the threat posed to aquatic life by open (uncaged) spinning blades would not pass environmental regulations.

BRIEF SUMMARY

In accordance with one aspect of the present disclosure, a hydrokinetic generator system for use in moving water is provided. The system includes a first generator assembly having a submersible first housing having an exterior with a fore section, an aft section that is aft of the fore section, a first attachment point at the fore section and a second attachment point at or on the aft section that is aft of the fore section, the first and second attachment points being spaced apart by a distance. The first generator assembly further includes a first generator mounted inside the first housing, the first generator having a gear box, and a center of mass located in the first housing between the first and second attachment points. The first generator assembly further includes a turbine shaft extending out of the aft section of the first housing and coupled to the gear box, a first turbine attached to the turbine shaft, the first turbine having an intake adjacent to the aft section of the first housing. The system further includes a flotation support structured to float on the water, a first cable having a first end attached to the flotation support and a second end attached to the first attachment point on the fore section of the submersible first housing, and a second cable having a first end attached to the flotation support and a second end attached to the second attachment point on the submersible first housing.

In accordance with another aspect of the present disclosure, the system further includes a submersible second housing with a second generator inside the second housing, the second housing being suspended from the first housing by second and fourth cables.

In accordance with another aspect of the present disclosure, the first and second cables are structured to be parallel and of equal length when attached to the submersible housing and the flotation support.

In accordance with still yet another aspect of the present disclosure, a weight in the housing is positioned in the fore section.

In accordance with a further aspect of the present disclosure, a shield is attached to the exterior of the submersible housing and positioned over the intake of the turbine at the aft section of the housing to deter aquatic life from entering the turbine.

In accordance with another aspect of the present disclosure, the turbine includes a shroud, and the turbine with shroud is sized and shaped to create a drag force when impacted by water current to cause the system to change orientation in the water and provide passive system orientation.

As will be readily appreciated from the foregoing, the generator of the present disclosure provides stability in the orientation of the generator when submerged in a stream of flowing water while suspended from a floating platform. The high-efficiency turbine increases output of the generator while also providing protection to aquatic life.

BRIEF DESCRIPTION OF THE SEVERAL VIEWS OF THE DRAWINGS

The foregoing features and advantages of the present disclosure will be more readily appreciated as the same become better understood from the following detailed description when taken in conjunction with the accompanying drawings, wherein:

FIGS. 13A-13B are side views of hydrokinetic generator assemblies connected to and disconnected from, respectively, a floating platform.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures or components or both associated with electric generators, floating platforms, and generator control systems have not been shown or described in order to avoid unnecessarily obscuring descriptions of the implementations.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

Reference throughout this description to "one implementation" or "an implementation" means that a particular feature, structure, or characteristic described in connection with the implementation is included in at least one implementation. Thus, the appearance of the phrases "in one implementation" or "in an implementation" in various places throughout the specification are not necessarily all referring to the same implementation. Furthermore, the particular features, structures, or characteristics may be combined in any suitable manner in one or more implementations.

The system and its components have been developed to address the unique environments presented by the geology of the fjords in Southeast Alaska and similar geologic structures, along with the protected wildlife, including aquatic life. In order to meet the demand for a new type of hydrokinetic generator, the turbine of the present disclosure addresses several requirements that no presently operating hydrokinetic turbine can address, including, without limitation:

- installation without building a foundation on the seafloor;
- operation without threatening local marine mammals and other aquatic life;
- installation in extreme depths (over 250')
- economically competitive with fossil fuel energy generation.

Figure 1:
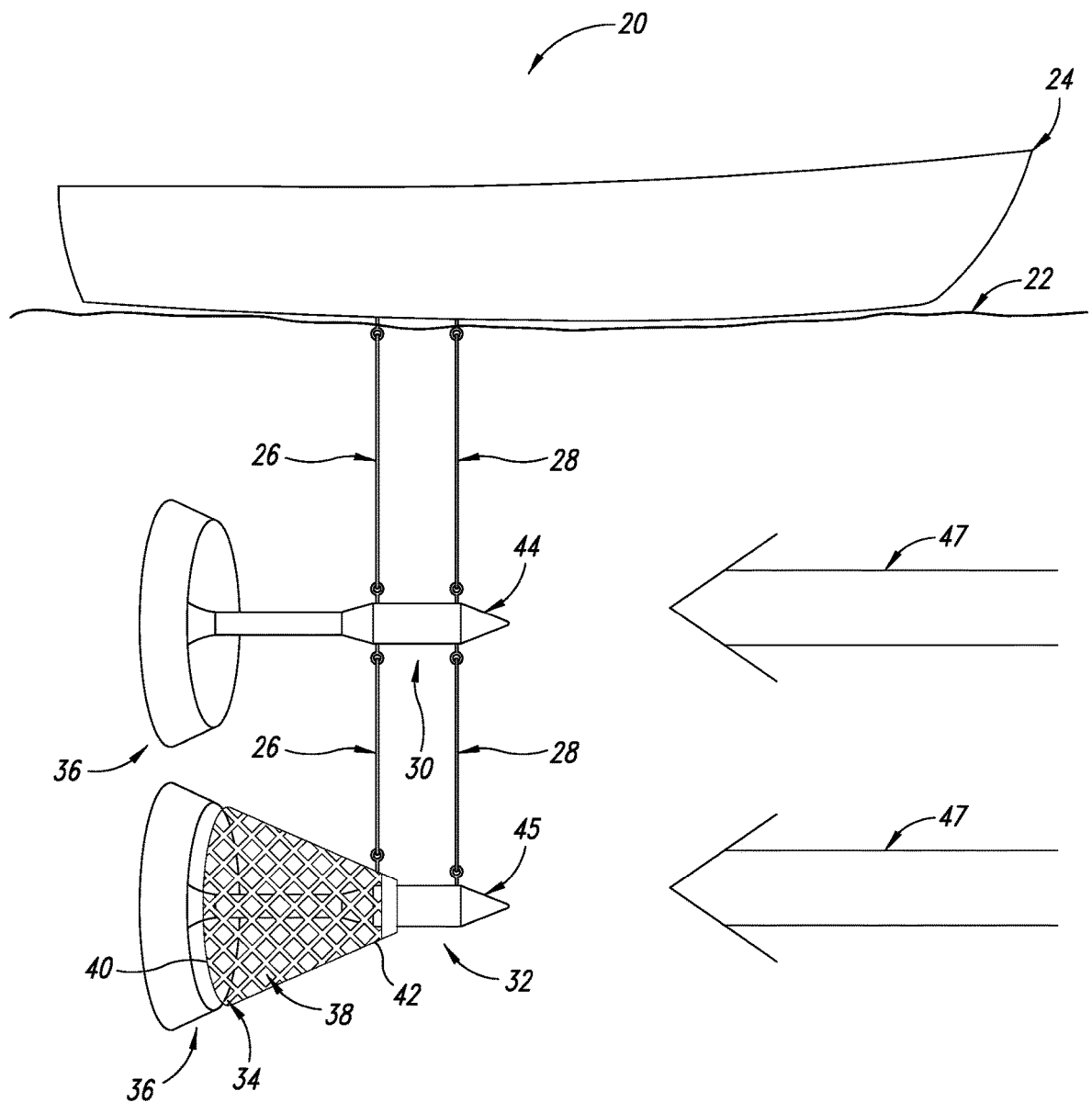
FIG. 1 illustrates a side view of a hydrokinetic generator system formed in accordance with the present disclosure.
Figure 2:
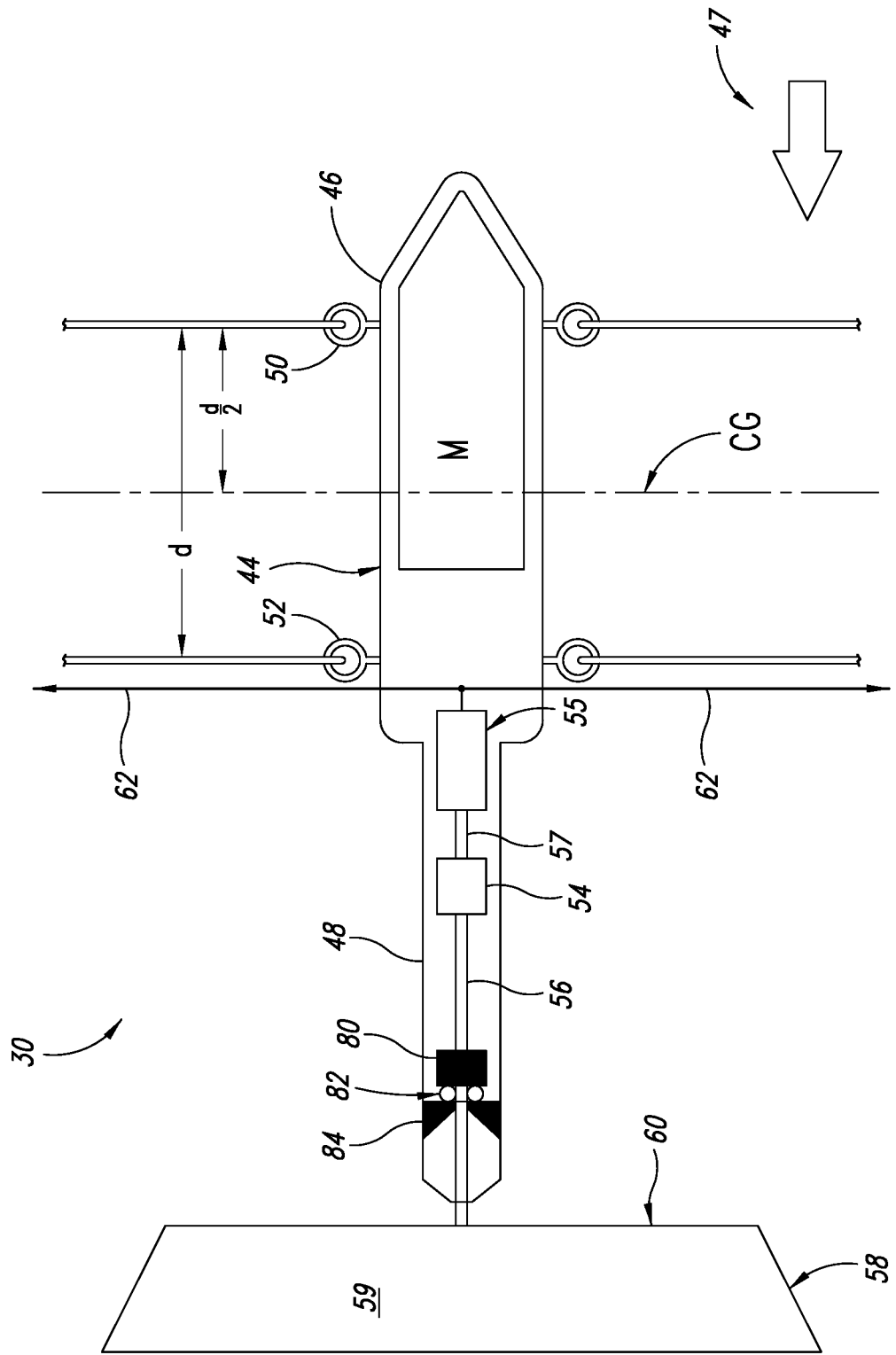
FIG. 2 is an enlarged side elevational view in partial cross section of a hydrokinetic generator assembly for use in the system of FIG. 1 formed in accordance with the present disclosure.
Figure 3:
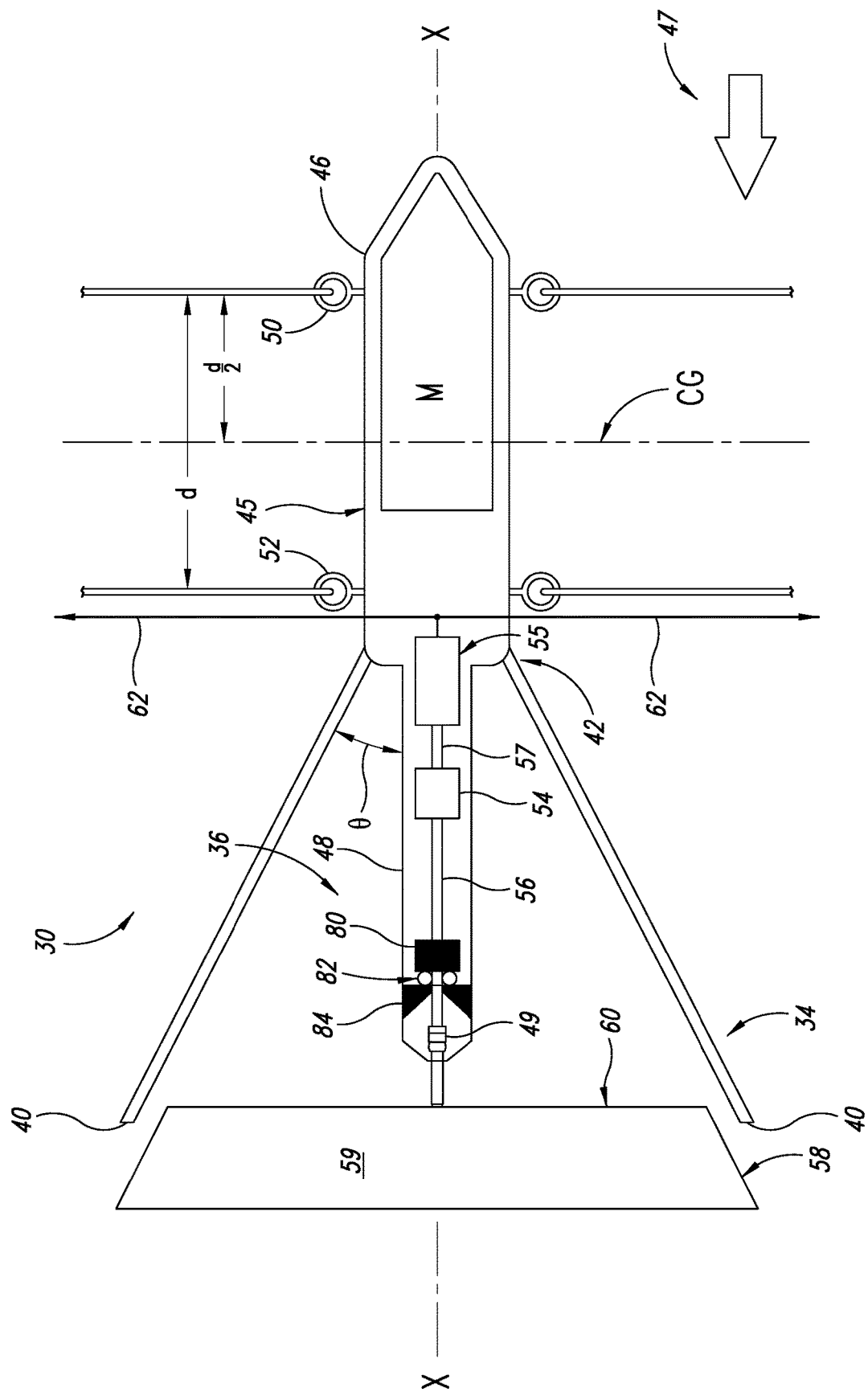
FIG. 3 is a side elevational view of the generator assembly of FIG. 2 showing an example of weight distribution in accordance with the present disclosure.

In accordance with one implementation of the present disclosure, and with reference initially to FIGS. 1-3, a system 20 for the hydrokinetic generation of electricity when submerged in water 22 is provided. The system 20 includes a platform 24 that floats on the water 22 and from which a pair of cables 26, 28, extends into the water 22 to suspend at least one first generator assembly 30. In some installations multiple generator assemblies can be suspended from a single pair of cables, such as the first generator assembly 30 and a second generator assembly 32 coupled to the pair of cables 26 and 28 in a stacked relationship as described more fully herein below. It is to be understood that while the system 20 is designed to adjust direction in response to the directional flow of water, it can be mounted on pilings in areas where the direction of the water is constant.

In order to protect aquatic life from injury or death, a shield 34 can be provided, for example, as shown positioned over an intake section 36 of the second generator assembly 32 as shown in FIG. 1 and FIG. 3. The first generator assembly 30 has no shield shown for purposes of illustrating the generator assembly's appearance and function without the shield 34. The shield 34 has openings 38 that are sized and shaped to permit water to flow therethrough while restricting aquatic life from passing through the shield 34 and into the intake section 36 of the second generator assembly 32. The design of the openings 38 is in part a function of shaping and sizing the openings 38 to restrict selected aquatic life while still enabling sufficient water to flow into the second generator assembly's intake section 36. The shape of the openings 38 may also be a matter of cosmetic appearance and ornamentality.

It will be noted that the shield 34 has an overall truncated conical shape with an aft end 40 of the cone sized and shaped to overlap—without contacting—the turbine 58 of the second generator assembly 32. In other words, the shield 34 diameter at the aft end 40 is about 110% of a diameter of a leading edge or inlet 60 of the turbine 58 and extends aft past the beginning or leading edge 60 of the turbine shroud 59 to prevent the intake of foreign objects. Ideally the angle theta ($\theta$) of the shield 34 with respect to a longitudinal axis X of the generator assembly 30 is less than 45 degrees. This is important to reduce suction on the unit area. A nose 42 of the cone-shaped shield 34 is similarly sized and shaped to match a size and shape of a first submersible housing 44 of the second generator assembly 32. The shield 34 is attached only to the housing 44, which can be done using conventional fastening means, including, without limitation, screws, adhesive, rivets, threads, detents, and the like.

Figure 4:
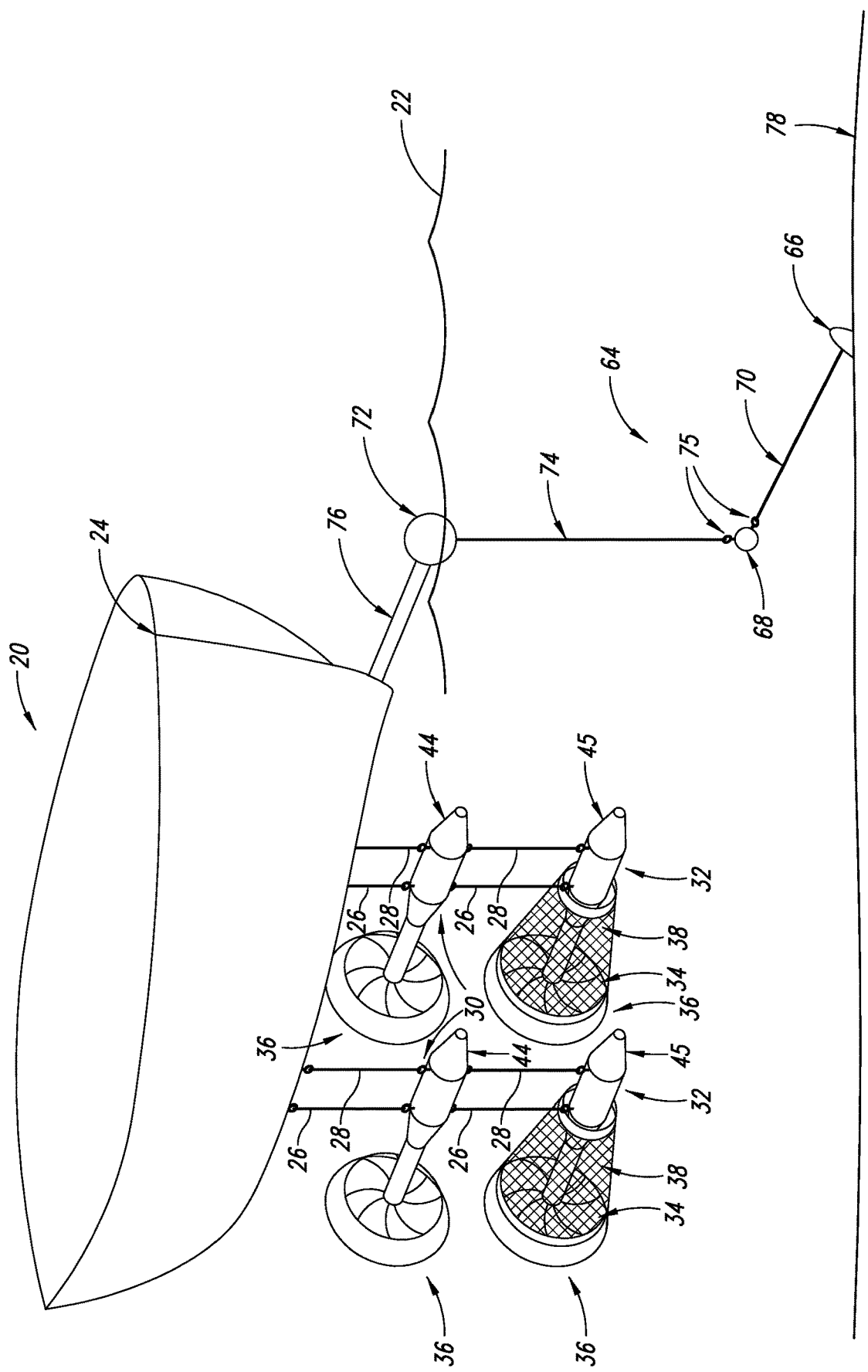
FIG. 4 is an illustration of the hydrokinetic generator system of FIG. 1 with an additional pair of hydrokinetic generator assemblies suspended below the floating platform.

As can be seen in FIGS. 1 and 4, the stacked first and second generator assemblies 30 and 32 are each facing upstream into the flow of water 22, which is illustrated by the enlarged directional arrow 47. As shown in FIG. 4, the system 20 can include an anchor assembly 64 that includes an anchor 66 coupled to a weight 68 via a first line 70, and a buoy 72 coupled to the weight 68 via a second line 74 and coupled to the floating platform 24 via a third line 76. The anchor 66 rests on the floor 78 of the body of water 22. The weight 68 is preferably attached to the first and second lines 70, 74 with a swivel 75 and is suspended at a length from the floating platform that is greater than a length of suspension of the first and second generator assemblies 30, 32 to prevent the lines 70, 74 from contacting the first and second generator assemblies 30, 32.

The first and second generator assemblies 30, 32 include respective first and second submersible housings 44, 45 that each have an exterior with a fore section 46, an aft section 48, a first attachment point 50 in the fore section 46 and a second attachment point 52 that is on a dividing line between the fore section 46 and an aft section 48. Generally, the forward section of the housings 44, 45 is forward of the second attachment point 52, and the aft section 48 is aft of the second attachment point 52, whether or not the shield 34 is used.

With the mass M in the housing 44, ideally a center of gravity (CG) of each generator assembly 30, 32 is located between the two attachment points 50, 52, preferably one half of the distance d (d/2) between the two attachment points 50, 52. This center of gravity (CG) of the first and second generator assemblies 30, 32 is located so that the structure aft of the second attachment point 52 is balanced by the structure that is forward of the second attachment point 52. When the shield 34 is attached to the housing 44, the center of gravity (CG) may shift slightly aft of its position as shown in the drawings. This can be addressed by adding to the mass M or moving the mass M forward, or a combination of both.

The mass M in the housing 44 does away with the need to hang a heavy weight from the generator assemblies 30, 32. As a result, the design is self-contained, cleaner looking, and uses less materials.

The first and second generator assemblies 30, 32 each include a gear box 54 and a gear motor 55 located inside the aft portion of the housing 44. They further include a turbine shaft 56 extending out an aft section 48 of the housing 44. The gear box 54 is attached to the turbine shaft 56, and the gear box 54 in turn is coupled by a coupling shaft 57 to the gear motor 55. It is to be understood that the turbine shaft 56 and the coupling shaft 57 can be a single unitary shaft in some designs.

The turbine 58 is attached to the turbine shaft 56 so that a leading edge or intake side 60 of the turbine 58 is adjacent the aft section 48 of the housing 44. The turbine 58 includes a shroud 59 that is also designed to deflect aquatic life.

A stopper 80 is attached to the shaft 57 with a set of ball bearings 82 mounted immediately aft of the stopper 80. A flange 84 is attached to the aft section 48 aft of the ball bearings 82 to receive the drag force exerted by the turbine 58 on the turbine shaft 56. The bearings 82 also reduce the forces exerted on the gear box 54 by the turbine shaft 56 and on the gear motor 55 by the coupling shaft 57. A waterproofing seal 49 is used on the shaft 56 adjacent the interior aft portion of the housing 44 to prevent water from entering the housing 44 at the entry point of the shaft 56.

The gear motor 55 is, in one implementation, an electrical energy generator that provides voltage and current on an electrical conductor or conductors, such as wires 62 (shown as a single line for illustrative purposes). The voltage may be AC or DC, depending on the type of means for generating electricity. Any known electricity generating means suitable for connecting to a rotating shaft may be used, including a DC generator, an AC alternator, and any other known electricity generating device. Preferably the generator assemblies 30, 32 are constructed for use in water depths of up to and including 100 meters. In another implementation, the generator device can be used in depths of 100 to 200 meters, and in yet other applications, the depth can exceed 200 meters.

While not of prime concern in submersible systems, it is important to consider cooling because generator devices can generate heat. The use in a tidal location or in a body of moving water, such as a river, utilizes passive cooling from the water flowing around the housings 44, 45. This does not rule out the use of an active cooling system, particularly as may be needed for larger installations.

A single opening can be provided in a bottom of the housings 44, 45. In the representative implementation illustrated and described herein, the mass M is locked in place and is not accessible. The shield 34 completely contains access to motors, generators, bearings, etc. It ideally covers all the openings in the housing 44 in the aft section 48.

Figure 5:
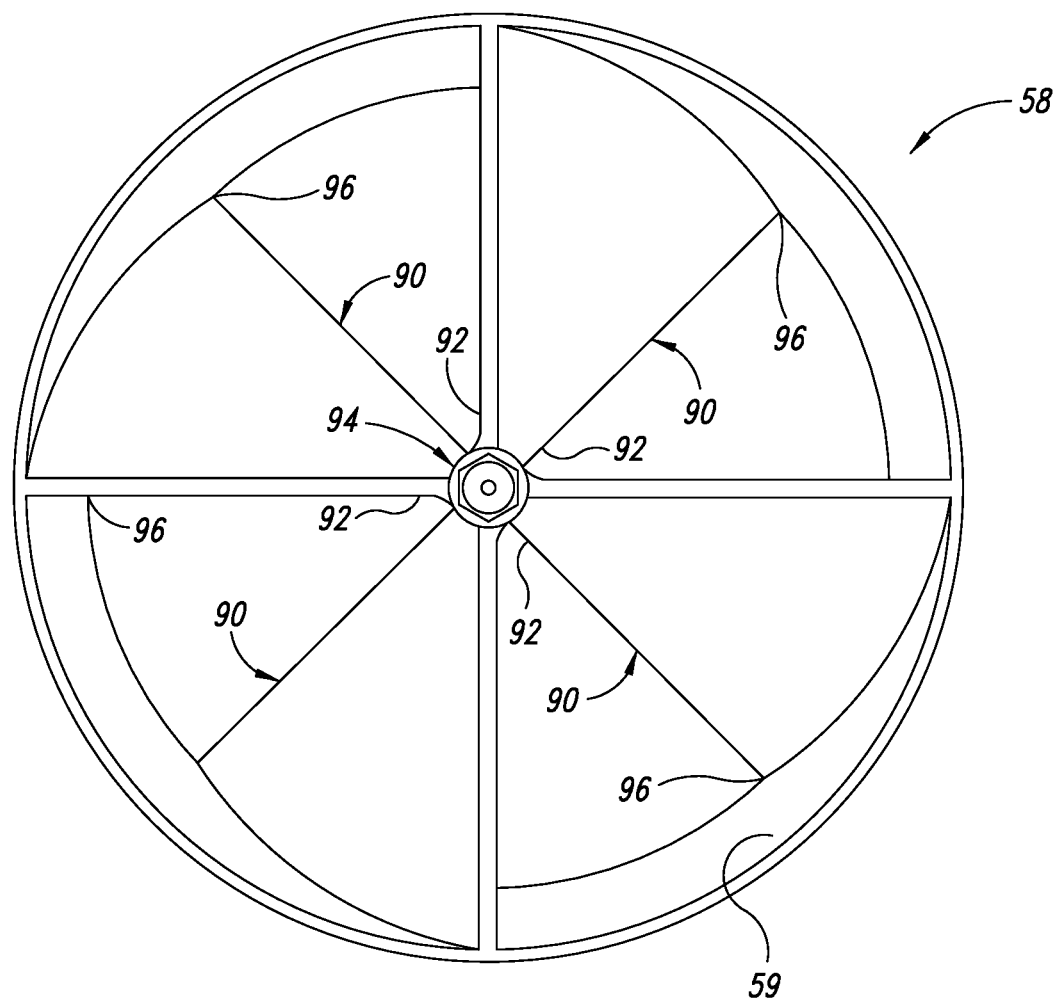
FIG. 5 is a rear plan view of a turbine formed in accordance with the present disclosure.
Figure 6:
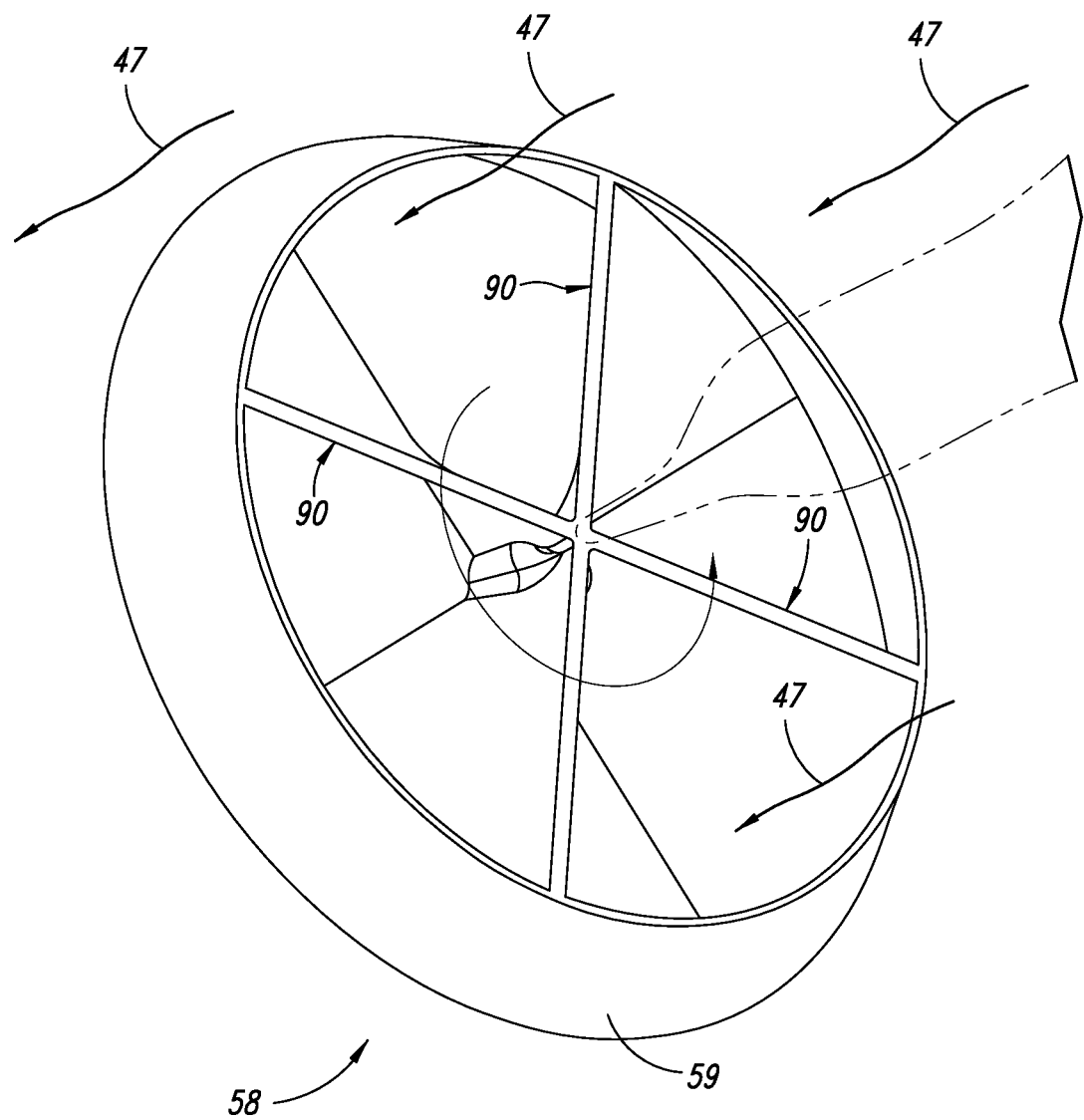
FIG. 6 is a bottom, left, front view of the turbine of FIG. 5.

FIGS. 5 and 6 illustrate the turbine 58 with four blades 90 attached to the shroud 59 and to a hub 94, the turbine comprising two or more twisted blades, each twisted blade having an axial end 92 coupled to the turbine shaft 56 via the hub 94 and a radial end 96 directly connected to the shroud 59. Preferably, an area of the radial end 96 of each twisted blade 90 is larger than an area of the axial end 92 of the respective twisted blade 90.

These are fixed blades 90, mainly for cost and technology. A variable pitched blade system could be used, although this creates complexity, weight, and cost. One approach is to identify a location for the turbine and analyze current flowing over time and determine an optimal turbine speed for that location and then design or change out the turbine to match the speed of the water.

There are four variables to balance in blade design (i) number of blades, (ii) the angle of the frustum, (iii) the twist of the blades, and (iv) the ratio of height to diameter. In one embodiment, the parameters are as follows:
(i) number of blades: 3 or 4 (not 2);
(ii) angle of Frustum: ~20-35 from vertical;
(iii) twist of the blades: ~30-45 degrees; and
(iv) ratio of height (h) to diameter: h<<diameter of outlet (currently using 0.125 ratio).

Due to the design of the turbine 58, the use of fins, rudders, and tails for directional stabilization or control are unnecessary. The turbine 58 acts to stabilize the system 20. The distance between the second attachment point 52 and the turbine 58 acts to stabilize the generator assemblies 30, 32, i.e., the greater the distance, the more stability the generator assemblies 30, 32 will have. Also, it has been found that the larger the distance d between the attachment points 50, 52, and the larger the distance between the turbine 58 and the second attachment point 52, the more stability is increased. However, it is possible to include lateral stabilizing fin(s), a caudal fin, or both, to passively keep the generator assemblies 30, 32, and the entire system 20 orientated towards the current flow.

As will be appreciated from the foregoing, the system of the present disclosure provides a simplified use of suspension cable(s) that is self-aligned with water current while suspended from a floating platform. The force of the fluid acting on the turbine keeps the device oriented into current. The cables provide for a stackable design, and the use of weights in the housings maintain stability and balance as well as orientation of the generator assemblies below the floating platform. The internal weight's gravitational force counteracts fluid force acting on the turbine to keep the generator apparatus stationary in the water flow and positioned under the floating platform. Electrical energy can be stored in the floating platform with batteries, sent to shore, or used to power a cryptocurrency mining system. An attachable shield protects aquatic and other wildlife.

Figure 7:
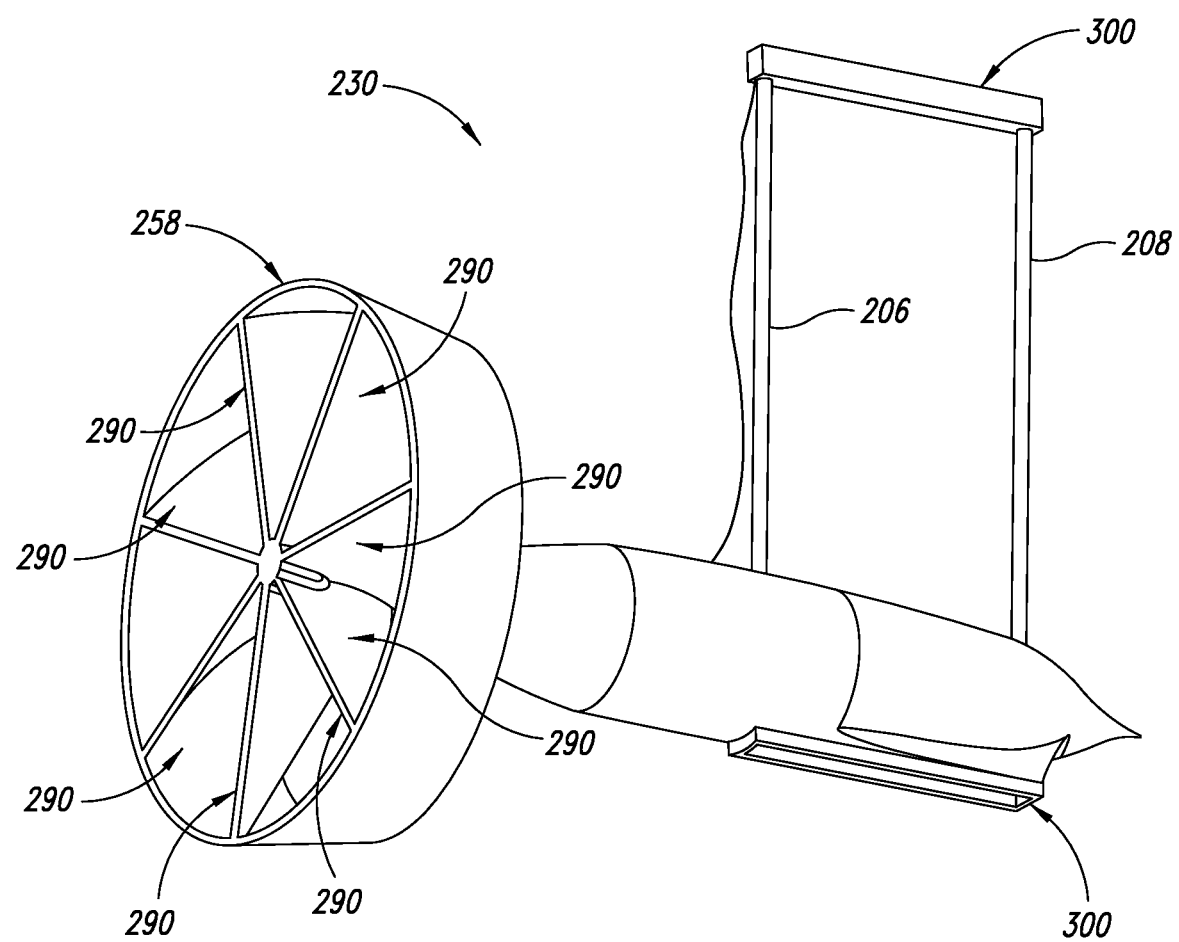
FIG. 7 is a bottom, right, rear view of another implementation of a hydrokinetic generator assembly formed in accordance with the present disclosure.
Figure 8:
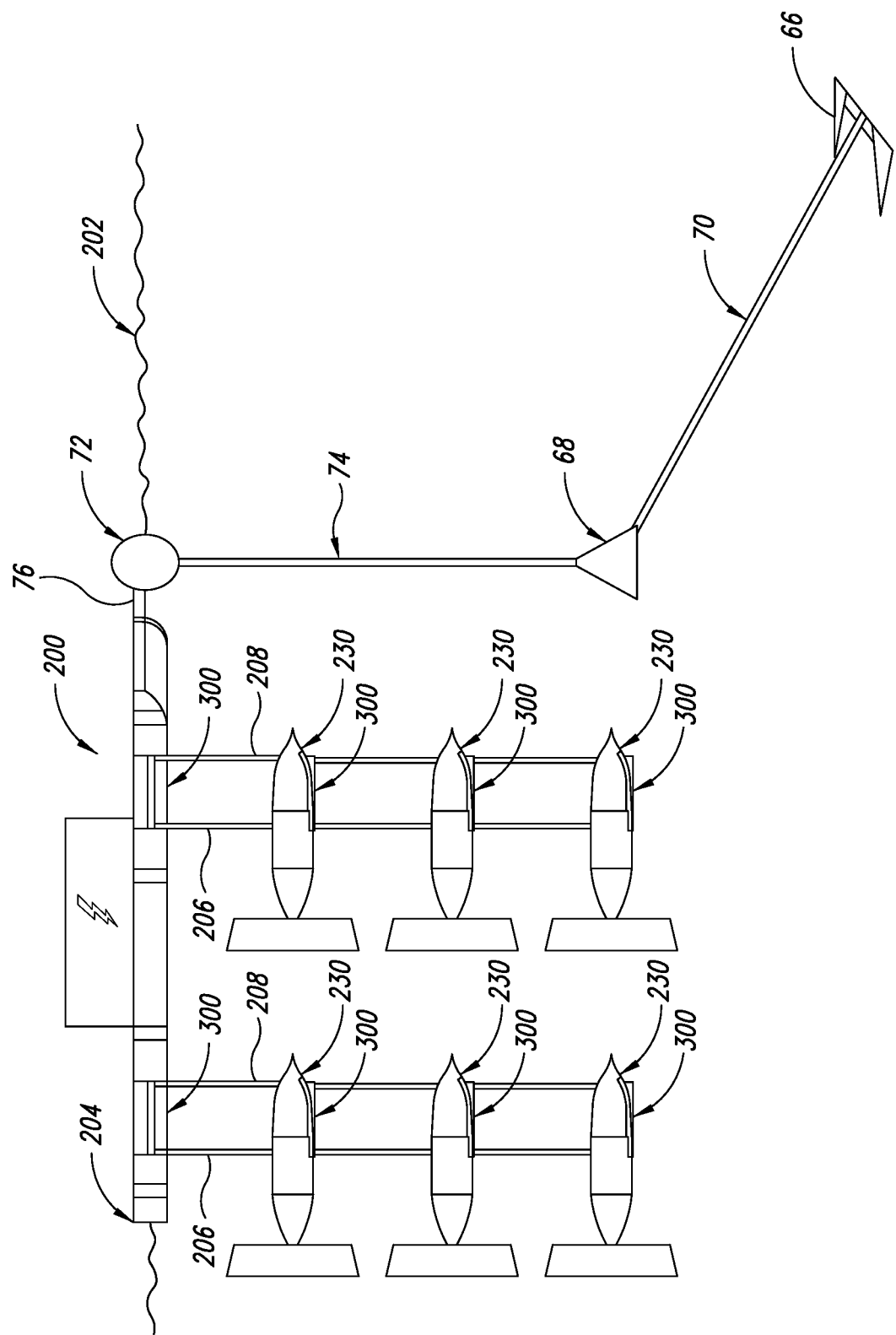
FIG. 8 is a side plan view of a plurality of a hydrokinetic electric generator system using multiple stacked generator assemblies of FIG. 7.
Figure 9:
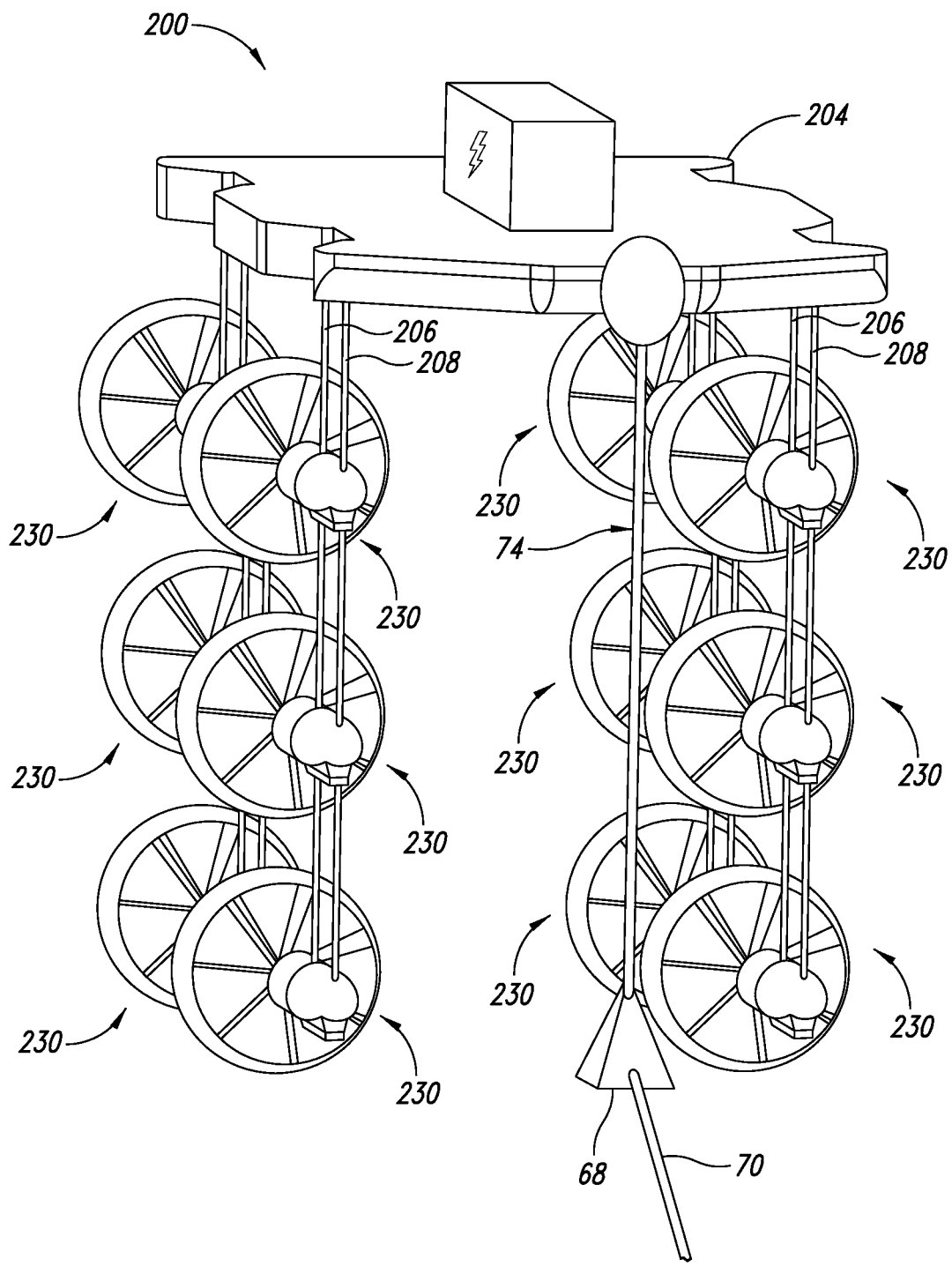
FIG. 9 is an upper, left, front view of the hydrokinetic electric generator system of FIG. 8.

Referring next to FIGS. 7-9, shown therein is another implementation of a hydrokinetic electric generator system 200 formed in accordance with the present disclosure. In this implementation, as with the previously described system, the hydrokinetic generator system 200 is structured to generate electricity when submerged in a stream of flowing water 202. The system 200 includes a platform 204 that floats on the water 202 and from which a pair of cables 206, 208, extend from the platform 204 into the water 202 to suspend at least one of a first generator assembly 230. In some installations, multiple generator assemblies 230 can be suspended from a single pair of cables 206, 208, such as the first generator assembly 230 and a second generator assembly 230 coupled to first and second cables 206 and 208 in a stacked relationship. It is to be understood that while the system 200 is designed to adjust direction in response to the directional flow of the water 202, such as tidal flows, it can be mounted on pilings in areas where the direction of the water 202 is constant.

It will be appreciated that many features of this second implementation are shared in common with the first implementation described above and will not be described in detail herein. Structural features in this second implementation that are the same or similar to structural features in the first implementation will be referred to using the same reference numbers.

Figure 10:
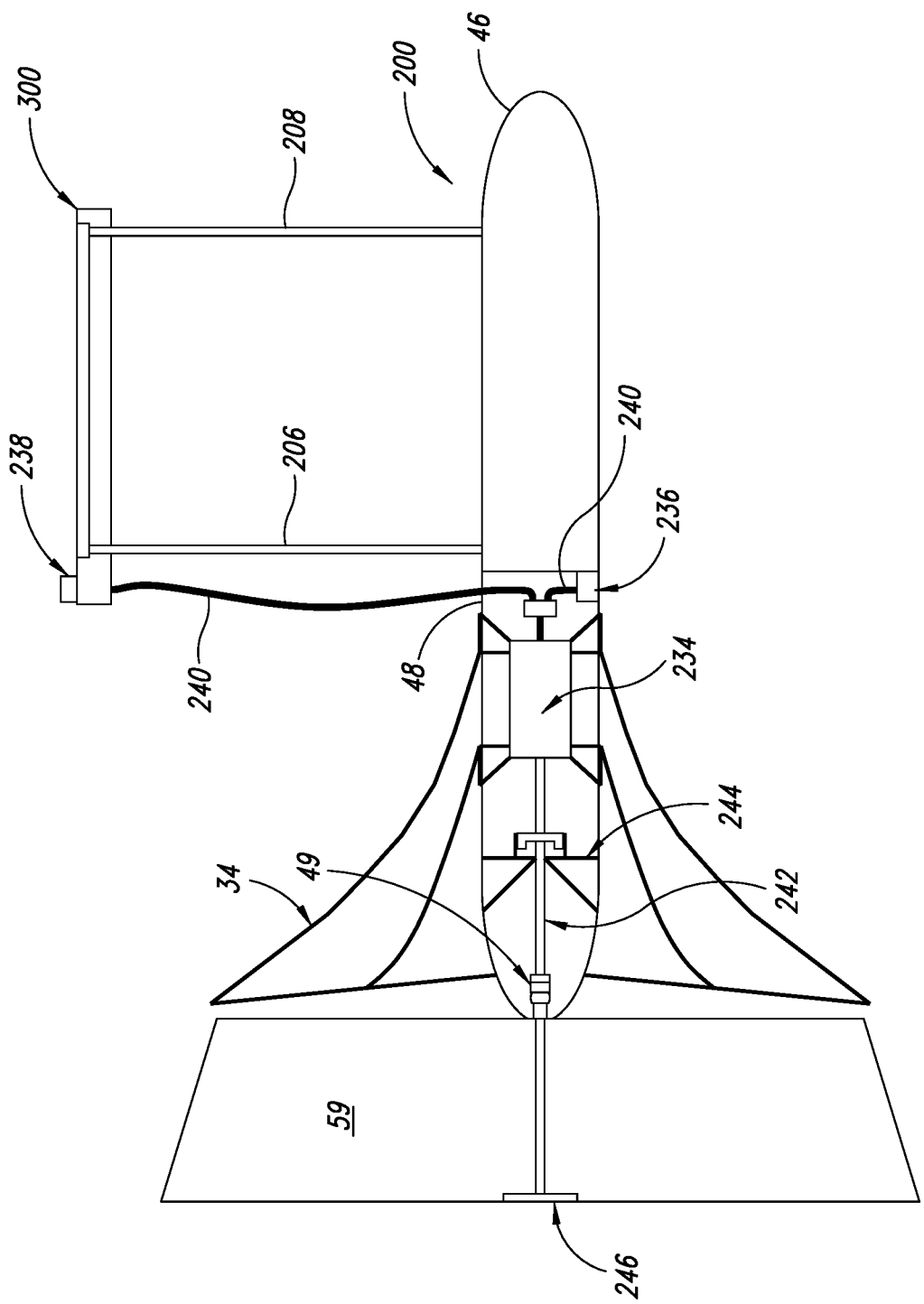
FIG. 10 is a side view in cross-section illustrating a hydrokinetic generator assembly formed in accordance with another implementation of the present disclosure.

In FIG. 10 a modified configuration of a first generator assembly 230 is shown in cross section. Features that are identical to or similar to the first generator assembly 30 described above will have the same reference numbers. In this implementation, the first generator assembly 230 includes the mass M, which can be concrete, in the fore section 46 and a generator 234 mounted in the aft section 48. The generator 234 is electrically coupled to a power inlet terminal 236 on a bottom side of the aft section 48 and to a power outlet terminal 238 on the locking assembly 300 by suitable conductors, such as insulated wires 240.

A shaft 242 extends from the generator 234 aftward through a load-bearing support 244, the seal 49, and into the turbine 59. A locking plate 246 attaches to the shaft 242 to retain the turbine 59 on the shaft 242.

One significant distinction is the configuration of the blades in the generator assembly 230. Each generator assembly 230 is provided with a turbine 258 with eight blades 290. As discussed above, there are four variables to balance in blade design: (i) number of blades, (ii) the angle of the frustum, (iii) the twist of the blades, and (iv) the ratio of height to diameter. Currently the ideal parameters for the eight-blade configuration are as follows:
  (i) number of blades: 7 or 8;
  (ii) angle of Frustum: ~10-15 degrees from vertical;
  (iii) twist of the blades: ~45-55 degrees; and
  (iv) ratio of height (h) to diameter: h<<diameter of outlet (currently using 0.237 ratio).

One significant change is in the structure used to suspend the generator assemblies 230 from the platform 204. In this implementation, the cables 206, 208 have a first end attached to a locking mechanism 300 that attaches to either the bottom of the platform 204 or to a bottom of the generator assembly 230.

As will be readily appreciated from the foregoing, the cables 206, 208 are now attached between the generator assembly 230 and the locking mechanism 300, not with the floating platform 204 itself. Additional locking mechanisms 300 are used to connect each successive stacked generator assembly 230. The generated electricity and communication cables will run through this locking mechanism 300 as well.

This implementation creates a modular system of self-contained generator assemblies 230 that is easy to manage because there are no loose cables. In addition, the generator assemblies 230 can be easily swapped out for maintenance or repair. The system is balanced under the locking mechanism 300 so it can be safely used as an attachment point for cranes, forklifts, and the like.

Referring next to FIGS. 11A, 11B through 14A,14B, shown therein are additional details regarding the connection and disconnection mechanisms for concatenating the generator assemblies in accordance with another aspect of the present disclosure.

Figures 11A, 11B:
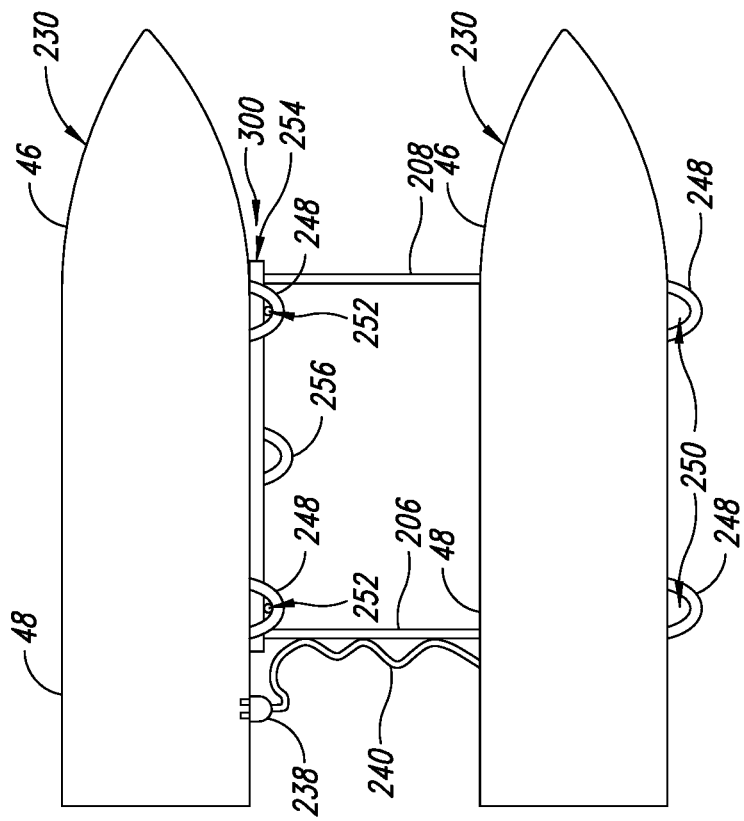
FIGS. 11A-11B are side views of connected and disconnected hydrokinetic generator assemblies, respectively.
Figure 12B:
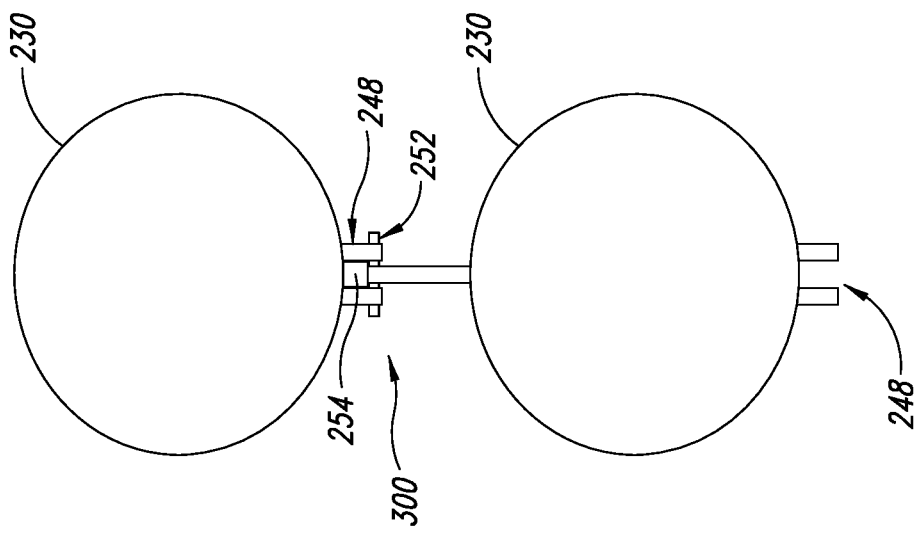
FIGS. 12A-12B are front views of the connected and disconnected hydroelectric generator assemblies of FIGS. 11A-11B.
Figure 12A:
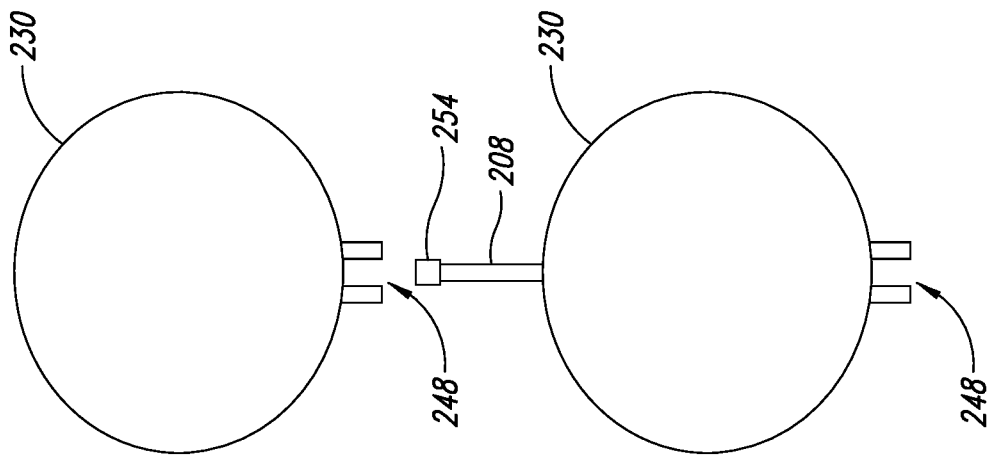

More particularly, FIGS. 11A-11B are side views of connected and disconnected generator assemblies 230, respectively, and FIGS. 12A-12B are front views of the connected and disconnected hydroelectric generator assemblies 230 of FIGS. 11A-11B.

As can be seen in these illustrations, each generator assembly 230 includes two pairs of coupling rings 248 extending from the bottom surface, one in the aft section 48 and one in the fore section 46. It is to be understood that while a pair of rings 248 is shown, other similar structures may be used that provide an opening 250 for securement to a mating component, such as a locking pin 252 as shown in FIG. 11B and FIG. 12B. The locking pin 252 extends through both of the coupling rings 248 and below a rigid support bar 254 that couples the terminal ends of the cables 206, 208 together. The locking pin 252 can take the form of any conventional mechanism to secure the support bar 254 to the rings 248 and can be retained in position using conventional means known to those skilled in the art, which will not be described in detail herein.

An anchor point 256 is also provided on the bottom about midway along the length of the support bar to provide a balanced attachment point for lifting and moving the generator assembly 230.

Figure 14B:
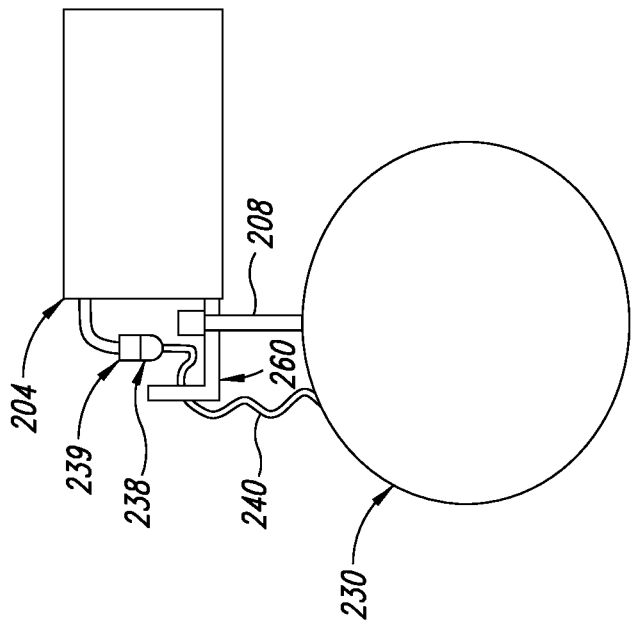
FIGS. 14A-14B are front views of the hydrokinetic generator assemblies of FIGS. 13A-13B connected to and disconnected from, respectively, the floating platform.
Figure 14A:
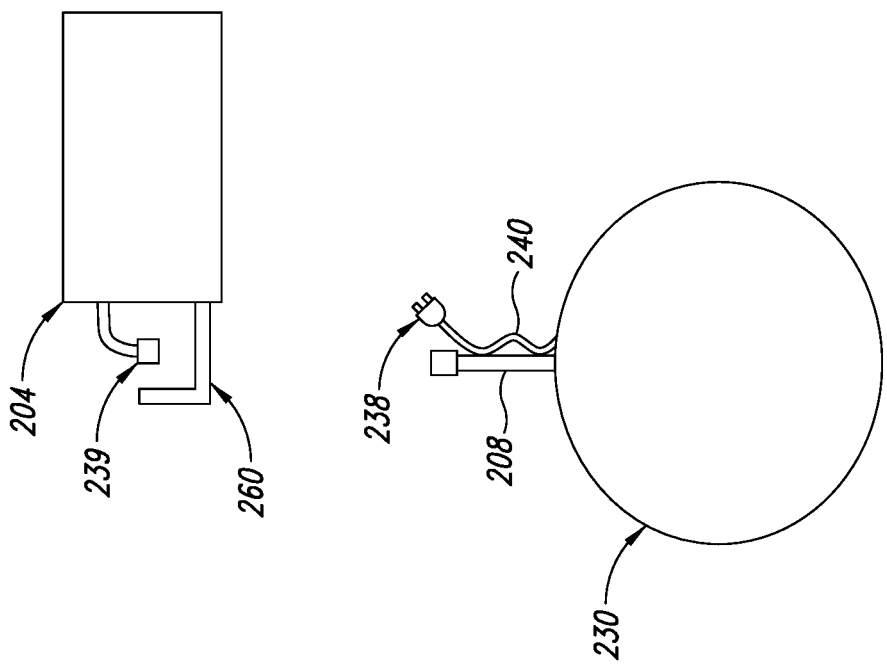

Referring next to FIGS. 13A-13B, these are side views of the hydrokinetic generator assembly 230 connected to and disconnected from, respectively, the floating platform 204; and FIGS. 14A-14B are front views of the hydrokinetic generator assembly 230 of FIGS. 13A-13B connected to and disconnected from, respectively, the floating platform 204.

As shown therein, the floating platform 204 has a pair of L-shaped load bearing supports 260 on which the horizontal support bar 254 rests. The output terminal 238 on the insulated wires 240 plugs into a power receptacle 239 on the floating platform 204. Electrical power is transferred via the wires 240 and plug-receptacle 238, 239 connections to the floating platform 204 for storage or transmission via electrical conductors to a shore location as described above.

The various implementations described above can be combined to provide further implementations. Aspects of the implementations can be modified, if necessary to employ concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A hydrokinetic generator system for use in water, the system comprising:
  a first generator assembly that includes:
    a submersible first housing having an exterior with a fore section, an aft section that is aft of the fore section, a first attachment point at the fore section and a second attachment point at the aft section, the first and second attachment points spaced apart by a distance, the first generator assembly having a center of gravity located between the first and second attachment points of the housing;
    a first generator inside the first housing, the first generator having a first gear box and a shaft extending out of the gear box and out of the aft section of the first housing; and a first turbine attached to the shaft, the turbine having an intake adjacent a terminal end of the aft section of the first housing;

a flotation support structured to float on the water; and a first cable having a first end structured to be coupled to the flotation support and a second end attached to the first attachment point on the fore section of the first housing, and a second cable having a first end structured to be coupled to the flotation support and a second end attached to the second attachment point at the aft section of the first housing.

2. The system of claim 1 further comprising a locking mechanism detachably mounted on the flotation support and structured to be attached to the first and second cables, wherein the first and second cables are structured to be parallel and of equal length when attached to the first housing and the locking mechanism on the flotation support.

3. The system of claim 1, further comprising a weight in the first housing positioned in the fore section of the first housing.

4. The system of claim 1 wherein the first generator assembly further comprises a shield attached to the exterior of the first housing that is sized and shaped to overlap the intake of the first turbine at the aft section of the first housing to deter aquatic life from entering the first turbine.

5. The system of claim 1 wherein the flotation support comprises a buoy and a suspended weight coupled to the buoy.

6. The system of claim 5 wherein the buoy is coupled to the suspended weight with at least one swiveling joint to enable the system to move in response to changes in a direction of water current.

7. The system of claim 6 wherein the system further comprises an anchor and wherein the suspended weight is coupled to the anchor with at least one swiveling joint.

8. The system of claim 1 wherein the system further comprises an anchor coupled to the flotation support by at least one swivel joint to anchor the flotation support to a bottom of the water.

9. The system of claim 1 wherein the first turbine includes a frustum-shaped shroud having an outlet and an inlet, the outlet structured to have a diameter that is larger than a diameter of the inlet.

10. The system of claim 9 wherein the first turbine comprises at least three twisted blades, each twisted blade having an axial end coupled to the shaft via a hub and a radial end connected to the shroud.

11. The system of claim 10 wherein an area of the radial end of each twisted blade is larger than an area of the axial end of the respective twisted blade.

12. The system of claim 1, further comprising a submersible second housing with a second generator inside the second housing, the second housing suspended from the first housing by third and fourth cables.

13. The system of claim 9 wherein the turbine with shroud is sized and shaped to create a drag force when impacted by water current to cause the system to change orientation in the water and provide passive system orientation.

14. The system of claim 1 wherein the first turbine comprises the following:
(i) number of blades: 3 or 4;
(ii) angle of Frustum: ~20-35 degrees from vertical;
(iii) twist of the blades: ~30-45 degrees; and
(iv) ratio of height (h) to diameter: h<<diameter of outlet.

15. The system of claim 14 wherein the ratio of h to diameter is 0.125.

16. The system of claim 1 wherein the first turbine comprises the following:
(i) number of blades: 7 or 8;
(ii) angle of Frustum: ~10-15 degrees from vertical;
(iii) twist of the blades: ~45-55 degrees; and
(iv) ratio of height (h) to diameter: h<<diameter of outlet.

17. The system of claim 16 wherein the ratio of h to diameter is 0.237.

18. The system of claim 2 wherein the locking mechanism comprises a support bar coupled to first ends of the first and second cables and further includes a first and second connector attached to the flotation support to receive the support bar.

19. The system of claim 2 wherein the locking mechanism comprises a support bar coupled to first ends of the first and second cables and further includes a first and second connector attached to a second generator assembly immediately adjacent to the first generator assembly to receive the support bar.

20. A hydrokinetic generator assembly for use with flowing water, the assembly comprising:

a submersible first housing having an exterior with a fore section, an aft section that is aft of the fore section, a first attachment point at the fore section and a second attachment point at the aft section, the first and second attachment points spaced apart by a distance, the hydrokinetic generator assembly having a center of gravity located between the first and second attachment points of the first housing;

a first generator inside the first housing, the first generator having a first gear box and a shaft extending out of the gear box and out of the aft section of the first housing; and a first turbine attached to the shaft, the turbine having an intake adjacent a terminal end of the aft section of the first housing, the turbine comprising more than two blades, each of the more than two blades coupled to the shaft and structured to turn the shaft in response to the flowing water interacting with the more than two blades.

21. The assembly of claim 20 wherein the turbine comprises the following:
(i) number of blades: 3 or 4;
(ii) angle of Frustum: ~20-35 degrees from vertical;
(iii) twist of the blades: ~30-45 degrees; and
(iv) ratio of height (h) to diameter: h<<diameter of outlet.

22. The assembly of claim 21 wherein the ratio of h to diameter is 0.125.

23. The assembly of claim 21 wherein the first turbine comprises the following:
(i) number of blades: 7 or 8;
(ii) angle of Frustum: ~10-15 degrees from vertical;
(iii) twist of the blades: ~45-55 degrees; and
(iv) ratio of height (h) to diameter: h<<diameter of outlet.

24. The assembly of claim 23 wherein the ratio of h to diameter is 0.237.

25. The assembly of claim 21 further comprising a housing having an exterior and an intake, and a shield attached to the exterior of the housing that is sized and shaped to overlap the intake to deter aquatic life from entering the intake.

* * * * *